United States Patent
Dietl et al.

(10) Patent No.: US 9,034,209 B2
(45) Date of Patent: May 19, 2015

(54) CORROSION PROTECTION FORMULATION FOR PROTECTION AGAINST ZINC AND CADMIUM CORROSION

(71) Applicant: BASF SE, Ludwigshafen (DE)

(72) Inventors: Harald Dietl, Ludwigshafen (DE); Uwe Nitzschke, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/969,850

(22) Filed: Aug. 19, 2013

(65) Prior Publication Data

US 2014/0056756 A1 Feb. 27, 2014

Related U.S. Application Data

(60) Provisional application No. 61/691,808, filed on Aug. 22, 2012.

(51) Int. Cl.

| | |
|---|---|
| *C23F 11/00* | (2006.01) |
| *C02F 5/02* | (2006.01) |
| *A01N 25/00* | (2006.01) |
| *C23F 11/12* | (2006.01) |
| *C09K 5/20* | (2006.01) |
| *C23F 11/10* | (2006.01) |

(52) U.S. Cl.
CPC .............. *C23F 11/128* (2013.01); *C09K 5/20* (2013.01); *C23F 11/10* (2013.01)

(58) Field of Classification Search
CPC .............. C23F 1/00; C23F 4/00; C23F 11/00; C23F 5/00
USPC .............. 422/7, 12–14; 134/6, 22.1; 252/175, 252/387; 424/126
See application file for complete search history.

(56) References Cited

U.S. PATENT DOCUMENTS

| | | | |
|---|---|---|---|
| 2,776,870 A | 1/1957 | Fischer et al. | |
| 5,178,786 A * | 1/1993 | Jahnke et al. | ................ 252/77 |
| 6,866,797 B1 | 3/2005 | Martin et al. | |
| 2007/0119529 A1 | 5/2007 | Hobson et al. | |

FOREIGN PATENT DOCUMENTS

| | | |
|---|---|---|
| EP | 0 414 398 A1 | 2/1991 |
| WO | WO 2004/099350 A1 | 11/2004 |
| WO | WO 2012/063164 A1 | 5/2012 |

OTHER PUBLICATIONS

International Search Report issued Oct. 4, 2013 in PCT/EP2013/066823 (with English translation of category of cited documents).
U.S. Appl. No. 13/891,591, filed May 10, 2013, Dietl, et al.
U.S. Appl. No. 13/866,276, filed Apr. 19, 2013, Dietl, et al.

* cited by examiner

*Primary Examiner* — Monzer R Chorbaji
(74) *Attorney, Agent, or Firm* — Oblon, McClelland, Maier & Neustadt, L.L.P.

(57) ABSTRACT

Corrosion protection formulation comprising (A) from 0.01 to 5% by weight of alkylamine ethoxylates as surfactant component, (B) from 0.01 to 10% by weight of corrosion inhibitors, (C) from 0 to 0.3% by weight of thickeners, (D) from 5 to <75% by weight of freezing point-lowering alcohols selected from among alkanols, glycols, polyalkylene glycols and glycerol, (E) from 5 to 90% by weight of vegetable and/or fatty oils, (F) from 0 to 5% by weight of water and (G) from 0 to 5% by weight of conventional emulsifiers. The formulation is particularly suitable for protecting zinc or zinc-plated components or surfaces or cadmium or cadmium-plated metallic surfaces against corrosion caused by runway deicing compositions used at airports.

17 Claims, No Drawings

CORROSION PROTECTION FORMULATION FOR PROTECTION AGAINST ZINC AND CADMIUM CORROSION

The present invention relates to a novel corrosion protection formulation and a method of protecting against zinc and cadmium corrosion by use of this corrosion protection formulation.

Each year, corrosion damage on zinc-plated components occurs on winter service vehicles and airports as a result of the use of the globally used, strongly alkaline runway deicing compositions based on alkali metal acetates and alkali metal formates. The snow plows, spreading vehicles, aircraft deicing vehicles and blow sweeping equipment used therefore require frequent maintenance and repair and have only a limited life. Zinc-plated and cadmium-plated components and surfaces of the aircraft taking off and landing are also subjected to increased corrosion by the strongly alkaline runway deicing compositions based on alkali metal acetates and alkali metal formates.

Corrosion protection formulations for vapor space corrosion protection during running in of vehicle engines are known, for example from WO 2012/063164 A1 (1) and the European patent application number 12165673.0 (2). Document (1) describes a thixotropic formulation composed of ethylene oxide or propylene oxide block copolymers as surfactants, castor oil ethoxylates, alkanolamines, organic carboxylic acids and triazoles as corrosion inhibitors, polyacrylate thickeners and monopropylene glycol. Document (2) describes a formulation composed of alkylamine ethoxylates as surfactants, castor oil ethoxylates, organic carboxylic acids and triazoles as corrosion inhibitors, polyacrylate thickeners and at least 75% by weight of monopropylene glycol. However, the abovementioned formulations from (1) and (2) do not display efficient zinc and cadmium corrosion protection.

Since there has hitherto not been an efficient corrosion protection for zinc and cadmium, the described corrosion damage on winter service vehicles at airports and for aircraft has to be accepted. Modified runway deicing compositions which cause less corrosion also cannot be used because of the strict environmental regulations for runway deicing formulations.

It is therefore an object of the invention to provide an efficient corrosion protection formulation which, in particular, alleviates the zinc and cadmium corrosion problems experienced by winter service vehicles at airports and for aircraft.

We have accordingly found a corrosion protection formulation which comprises (A) from 0.01 to 5% by weight, preferably from 0.1 to 3% by weight, especially from 0.5 to 1.5% by weight, of one or more alkylamine ethoxylates as surfactant component, (B) from 0.01 to 10% by weight, preferably from 0.5 to 7% by weight, especially from 1 to 5% by weight, of one or more corrosion inhibitors, (C) from 0 to 0.3% by weight, preferably from 0.0001 to 0.15% by weight, especially from 0.005 to 0.05% by weight, of one or more thickeners, (D) from 5 to <75% by weight, preferably from 10 to 70% by weight, especially from 25 to 55% by weight, of one or more freezing point-lowering alcohols selected from among alkanols, glycols, polyalkylene glycols and glycerol, (E) from 5 to 90% by weight, preferably from 15 to 80% by weight, especially from 35 to 60% by weight, of one or more vegetable and/or fatty oils, (F) from 0 to 5% by weight, preferably from 0.1 to 4% by weight, especially from 0.5 to 3% by weight, of water and (G) from 0 to 5% by weight, preferably from 0.1 to 4% by weight, especially from 0.5 to 3% by weight, of a conventional emulsifier, where the sum of the components (A) to (G) in all cases is 100% by weight.

The components (A) to (G) are as a rule the important components of the corrosion protection formulation of the invention. In addition, relatively small amounts of further components such as further surface-active compounds which can aid the surfactant action of component (A), antifoams, dyes or fragrances can also be comprised, but these have no or no significant influence on the corrosion-inhibiting effect.

A critical characteristic of the corrosion protection formulation of the invention is its physical consistency which is based, in particular, on the concomitant use of vegetable and/or fatty oils as component (E) and the physical interaction of the component (E) with the thickener of the component (C) and the surfactant of the component (A). The corrosion protection formulation of the invention is sufficiently fluid for it to be able to be applied without problems by means of conventional techniques, with uniform covering of the metal surfaces to be protected being achieved, but owing to its viscosity and its partially thixotropic properties adheres well and for a long time to the metal surfaces to be protected, thus ensuring lasting protection.

The alkyl radical in the alkylamine ethoxylates of the component (A) can be based on a secondary or preferably primary monoamine which can be ethoxylated. Secondary or preferably primary aliphatic monoamines are normally used, but polyamines having at least one secondary and/or primary amino group which can be ethoxylated can also be used. The alkyl radical on the nitrogen atom usually comprises saturated linear or saturated branched alkyl groups; however, the term "alkali" can also refer to unsaturated linear, unsaturated branched or saturated or unsaturated cyclic hydrocarbon groups.

In a preferred embodiment, the corrosion protection formulation of the invention comprises, as component (A), at least one alkylamine ethoxylate which comprises at least one linear or branched $C_3$-$C_{20}$-alkyl radical, preferably a linear or branched $C_6$-$C_{13}$-alkyl radical, in particular a linear or branched $C_7$-$C_{12}$-alkyl radical, especially a linear or branched $C_8$-$C_{11}$-alkyl radical. The term "alkyl" in this context is preferably a saturated and acyclic hydrocarbon group. The alkylamine ethoxylates can also comprise mixtures of such alkyl radicals, for example a mixture of homologous alkyl radicals, depending on the specific industrial or natural origin of the alkylamines used.

Suitable examples of specific alkylamines which can be ethoxylated and then be used in this form as surfactant component (A) for the corrosion protection formulation of the invention are n-propylamine, isopropylamine, n-butylamine, isobutylamine, sec-butylamine, tert-butylamine, n-pentylamine, tert-pentylamine, n-hexylamine, n-heptylamine, n-octylamine, 2-ethylhexylamine, n-nonylamine, n-decylamine, 2-propylheptylamine, n-undecylamine, n-dodecylamine, n-tridecylamine, isotridecylamine, n-tetradecylamine, n-pentadecylamine, n-hexadecylamine, n-heptadecylamine, n-octadecylamine, n-nonadecylamine, n-eicosylamine, di(n-hexyl)amine, di(n-heptyl)amine, di(n-octyl)amine, di(2-ethylhexyl)amine, di(n-nonyl)amine, di(n-decyl)amine, di(2-propylheptyl)amine, di(n-undecyl)amine, di(n-dodecyl)amine, di(n-tridecyl)amine, di(isotridecyl)amine, di(n-tetradecyl)amine, di(n-pentadecyl)amine, di(n-hexadecyl)amine, di(n-heptadecyl)amine, di(n-octadecyl)amine, di(n-nonadecyl)amine, di(n-eicosyl)amine, n-hexylmethylamine, n-heptylmethylamine, n-octylmethylamine, (2-ethylhexyl)methylamine, n-nonylmethylamine, n-decylmethylamine, (2-propylheptyl)methylamine, n-undecylmethylamine, n-dodecylmethylamine, n-tridecylmethylamine, isotridecylmethylamine, n-tetradecylmethylamine, n-pentadecylmethylamine, n-hexadecylmethylamine, n-heptadecylmethylamine, n-octadecylmethylamine, n-nonadecylmethylamine and n-eicosylmethylamine.

The alkyl radicals in the alkylamine ethoxylates can originate entirely from the production of the corresponding intermediates by petrochemical processes, e.g. industrial $C_8$-$C_{15}$-alkyl mixtures, 2-ethylhexyl or 2-propylheptyl, or can be based partially or completely on renewable raw materials, e.g. fatty amines such as stearylamine, oleylamine or tallow fatty amine.

In a preferred embodiment, the corrosion protection formulation of the invention comprises at least one alkylamine ethoxylate comprising from 1 to 35 ethylene oxide units, based on the alkylamine molecule, as component (A). This degree of ethoxylation is even more preferably from 1.5 to 15, in particular from 1.8 to 9, especially from 2 to 6, ethylene oxide units per alkylamine molecule. This degree of ethoxylation is a statistical value, i.e. the alkylamine ethoxylates normally have to be regarded as mixtures of compounds (homologs) having different numbers of ethylene oxide units.

In a particularly preferred embodiment, the corrosion protection formulation of the invention comprises at least one alkylamine ethoxylate which contains at least one linear $C_3$-$C_{20}$-alkyl radical and from 1 to 35 ethylene oxide units, more preferably at least one linear $C_6$-$C_{13}$-alkyl radical and from 1.5 to 15 ethylene oxide units, in particular at least one linear $C_7$-$C_{12}$-alkyl radical and from 1.8 to 9 ethylene oxide units, especially at least one linear $C_8$-$C_{11}$-alkyl radical and from 2 to 6 ethylene oxide units, as component (A).

The alkylamine ethoxylates mentioned can be primary amines having an oxyethylene chain and the general formula alkyl-NH—$(CH_2CH_2O)_m$—H or primary amines having two oxyethylene chains and the general formula alkyl-N[$(CH_2CH_2O)_p$—H][$(CH_2CH_2O)_q$—H] or secondary amines of the general formula (alkyl)$_2$N—$(CH_2CH_2O)_m$—H or mixtures of such primary amines having an oxyethylene chain with such primary amines having two oxyethylene chains or mixtures of such primary ethoxylated amines with such secondary ethoxylated amines, where m or (p+q) denote the total degrees of ethoxylation. Residual amounts of unethoxylated alkylamines can be present in relatively small amounts in the alkylamine ethoxylates, in particular at low total degrees of ethoxylation of less than 2.

A typical alkylamine ethoxylate which can be used in the corrosion protection formulation of the invention is octylamine (caprylamine) having 2 ethylene oxide units, which is commercially available.

The alkylamine ethoxylates mentioned can be prepared by conventional methods, for example by reaction of the alkylamines with ethylene oxide in the presence of alkali metal hydroxide catalysis or double metal cyanide catalysis; both methods are known to those skilled in the art.

If further surface-active compounds which aid the surfactant action of component (A) are to be concomitantly used in the corrosion protection formulation of the invention, these can, for example, be selected from the surface-active compounds listed in document (1). Such additional surface-active compounds can be anionic, cationic or nonionic surfactants.

Particularly suitable additional nonionic surfactants are based on polyethers. Apart from unmixed polyalkylene oxides, preferably $C_2$-$C_4$-alkylene oxides and phenyl-substituted $C_2$-$C_4$-alkylene oxides, in particular polyethylene oxides, polypropylene oxides and poly(phenylethylene oxides), block copolymers, in particular polymers having polypropylene oxide and polyethylene oxide blocks or poly (phenylethylene oxide) and polyethylene oxide blocks, and also random copolymers of these alkylene oxides are especially suitable here.

These polyalkylene oxides can be prepared by polyaddition of the alkylene oxides onto starter molecules such as saturated or unsaturated aliphatic and aromatic alcohols, saturated or unsaturated aliphatic and aromatic amines, saturated or unsaturated aliphatic carboxylic acids and carboxamides. It is usual to use from 1 to 300 mol, preferably 3 to 150 mol, of alkylene oxide per mole of starter molecule.

Suitable aliphatic alcohols generally comprise from 6 to 26 carbon atoms, preferably from 8 to 18 carbon atoms, and can have an unbranched, branched or cyclic structure. Examples which may be mentioned are octanol, nonanol, decanol, isodecanol, undecanol, dodecanol, 2-butyloctanol, tridecanol, isotridecanol, tetradecanol, pentadecanol, hexadecanol (cetyl alcohol), 2-hexyldecanol, heptadecanol, octadecanol (stearyl alcohol), 2-heptylundecanol, 2-octyldecanol, 2-nonyltridecanol, 2-decyltetradecanol, oleyl alcohol and 9-octadecenol and also mixtures of these alcohols, e.g. $C_8/C_{10}$-, $C_{13}/C_{15}$- and $C_{16}/C_{18}$-alcohol, cyclopentanol and cyclohexanol. The saturated and unsaturated fatty alcohols obtained by cleavage and reduction of fats from natural raw materials and the synthetic fatty alcohols from the oxo synthesis are of particular interest. The alkylene oxide adducts on these alcohols usually have an average molecular weight $M_n$ of from 200 to 5000.

As examples of the abovementioned aromatic alcohols, mention may be made not only of unsubstituted phenol and α- and β-naphthol but also the alkyl-substituted products which are in particular, substituted by $C_1$-$C_{12}$-alkyl, preferably $C_4$-$C_{12}$- or $C_1$-$C_4$-alkyl e.g. hexylphenol, heptylphenol, octylphenol, nonylphenol, isononylphenol, undecylphenol, dodecylphenol, dibutyl and tributylphenol and dinonylphenol, and also bisphenol A and its reaction products with styrene, especially bisphenol A substituted in the ortho positions relative to the two OH groups by a total of 4 phenyl-1-ethyl radicals.

Suitable aliphatic amines correspond to the abovementioned aliphatic alcohols. Here too, the saturated and unsaturated fatty amines, which preferably have from 14 to 20 carbon atoms, are of particular importance. As aromatic amines, mention may be made by way of example of aniline and its derivatives.

Suitable aliphatic carboxylic acids are, in particular, saturated and unsaturated fatty acids, which preferably comprise from 14 to 20 carbon atoms, and hydrogenated, partially hydrogenated and unhydrogenated resin acids and also polybasic carboxylic acids, e.g. dicarboxylic acids such as maleic acid. Suitable carboxamides are derived from these carboxylic acids.

Apart from the alkylene oxide adducts onto the monofunctional amines and alcohols, the alkylene oxide adducts onto at least bifunctional amines and alcohols are of very particular interest.

As at least bifunctional amines, preference is given to bifunctional to pentafunctional amines which, in particular correspond to the formula $H_2N$—$(R^1$—$NR^2)_n$—$H(R^1=C_2$-$C_6$-alkylene; $R^2$=hydrogen or $C_1$-$C_6$-alkyl; n=1 to 5). Specific examples are: ethylenediamine, diethylenetriamine, triethylenetetramine, tetraethylenepentamine, 1,3-propylenediamine, dipropylenetriamine, 3-amino-1-ethyleneaminopropane, hexamethylenediamine, dihexa-methylenetriamine, 1,6-bis(3-aminopropylamino)hexane and N-methyldipropylenetriamine, with hexamethylenediamine and diethylenetriamine being particularly preferred and ethylenediamine being very particularly preferred.

These amines are preferably reacted firstly with propylene oxide and subsequently with ethylene oxide. The content of ethylene oxide in the block copolymers is usually from about 10 to 90% by weight.

The block copolymers based on polyfunctional amines generally have average molecular weights $M_n$ of from 1000 to 40 000, preferably from 1500 to 30 000.

As at least bifunctional alcohols, preference is given to bifunctional to pentafunctional alcohols. Examples which may be mentioned are $C_2$-$C_6$-alkylene glycols and the corresponding dialkylene glycols and polyalkylene glycols, e.g. ethylene glycol, 1,2- and 1,3-propylene glycol, 1,2- and 1,4-butylene glycol, 1,6-hexylene glycol, dipropylene glycol and polyethylene glycol, glycerol and pentaerythritol, with ethylene glycol and polyethylene glycol being particularly preferred and propylene glycol and dipropylene glycol being very particularly preferred.

Particularly preferred alkylene oxide adducts onto at least bifunctional alcohols have a central polypropylene oxide block, i.e. start out from a propylene glycol or polypropylene glycol which is reacted firstly with further propylene oxide and then with ethylene oxide. The content of ethylene oxide in the block copolymers is usually from 10 to 90% by weight.

The block copolymers based on polyfunctional alcohols generally have average molecular weights $M_n$ of from 1000 to 20 000, preferably from 1000 to 15 000.

Such alkylene oxide block copolymers are known and are commercially available, for example under the names Tetronic®, Pluronic® and Pluriol® (BASF) and Atlas® (Uniquema).

Of course, it is also possible to use mixtures of a plurality of such additional surfactants.

Particular preference is given to selecting surfactants which display very little foaming. If surfactants which foam to a great extent are used, it is possible to counter this property by use of antifoams.

Suitable corrosion inhibitors of the component (B) are all materials which can potentially reduce or completely prevent the corrosion of metallic surfaces or metallic components which consist of zinc and/or cadmium or comprise zinc and/or cadmium.

One class of suitable corrosion inhibitors comprises, for example, salts of benzoic acids. Preference is given to ammonium salts or salts of alkali metals or alkaline earth metals. Particular preference is given to sodium or ammoniums salts. The anions of benzoic acid can be unsubstituted or substituted benzoic acid. Examples of substituents on the aromatic ring of the benzoic acid are alkyl radicals, in particular methyl, ethyl, n-propyl, isopropyl, n-butyl, tert-butyl, isobutyl. These groups can optionally be further substituted. The benzoic acid can be monosubstituted or polysubstituted. Preference is given to unsubstituted benzoic acid or monosubstituted benzoic acids.

Another class of suitable corrosion inhibitors comprises ammonium salts of monocarboxylic or dicarboxylic acids. Preference is given to ammonium salts of $C_1$-$C_{12}$-monocarboxylic or -dicarboxylic acids. Particular preference is given to salts of $C_4$-$C_{12}$-monocarboxylic or -dicarboxylic acids. These monocarboxylic or dicarboxylic acids can comprise one or more substituents. In particular, they can have one or more OH groups.

A further class of suitable corrosion inhibitors comprises heterocyclic compounds, in particular nitrogen-heterocyclic compounds, which are preferably aromatic. Suitable nitrogen-heterocyclic compounds can bear one or more substituents. In a preferred variant, they are fused with other aromatic rings. Preferred nitrogen-heterocyclic compounds are, for example, azoles. Particular preference is given to triazoles or thiazoles. Examples of suitable azoles are benzazoles or toluazoles. Examples of suitable triazoles are benzotriazole or tolutriazole. Examples of suitable thiazoles are benzothiazole or 2-mercaptobenzothiazole.

Phosphates are also suitable as corrosion inhibitors. For the purposes of the present invention, these are first and foremost salts of phosphoric acid. Suitable phosphates are formed, for example, by adjusting the pH of an aqueous solution of phosphoric acid by means of bases. All bases which form soluble salts in the corrosion protection formulation of the invention are in principle suitable for adjusting the pH. Preferred bases are alkali metal hydroxides such as sodium hydroxide or potassium hydroxide.

Further suitable corrosion inhibitors are nitrites such as sodium or potassium nitrite. Phosphates are frequently combined with nitrates.

Water-soluble secondary or tertiary amines are likewise suitable as corrosion inhibitor. Examples of the class of these corrosion inhibitors are diethanolamine and triethanolamine.

Further suitable corrosion inhibitors are esters of polyfunctional alcohols and carboxylic acids. Suitable polyfunctional alcohols are, for example, diols, triols or tetrols which can optionally be alkoxylated and can have been produced petrochemically or on the basis of renewable raw materials. Suitable esters generally have a molar mass of not more than 10 000 g/mol, preferably less than 5000 g/mol and particularly preferably less than 2000 g/mol. In one embodiment, suitable esters additionally bear unesterified alcohol or carboxylic acid groups.

Further suitable corrosion inhibitors are polyethers of fatty alcohols. These can have been produced completely petrochemically or entirely or partially on the basis of renewable raw materials. They are generally alkoxylates, preferably ethoxylates. Preference is given to polyethers of fatty alcohols which comprise from 2 to 200 mol of ethylene oxide per mole. Polyethers of fatty alcohols particularly preferably comprise from 4 to 100 mol of ethylene oxide per mole or from 5 to 60 mol of ethylene oxide per mol. Polyethers of fatty alcohols can also have further alkylene oxides such as propylene oxide, butylene oxide or styrene oxide in various amounts in addition to ethylene oxide. Suitable polyethers of fatty alcohols usually have hydroxyl numbers in accordance with DIN 53240 of from 10 to 500, preferably from 20 to 200. In one embodiment, the hydroxyl number is from 30 to 100, in another embodiment form 110 to 180.

A preferred corrosion inhibitor for the component (B) is alkoxylated castor oil, preferably ethoxylated castor oil. Particular preference is given to a castor oil ethoxylate comprising from 2 to 200 mol of ethylene oxide per mol. In particular, the castor oil ethoxylate comprises from 4 to 100 mol of ethylene oxide per mol or from 5 to 60 mol of ethylene oxide per mol. Alkoxylated castor oil can also have further alkaline oxides such as propylene oxide, butylene oxide or styrene oxide in various amounts in addition to ethylene oxide. The solubility and the phase inversion temperature can be influenced by the degree of alkoxylation of the castor oil and optionally the ratio of the various alkylene oxides.

The corrosion protection formulation of the invention frequently comprises additives which stabilize the pH and thus likewise contribute to the inhibition of corrosion. An example of such an additive is Borax.

The component (B) can consist of only one corrosion inhibitor but more frequently comprises a combination of various corrosion inhibitors. In a preferred embodiment, the corrosion protection formulation of the invention comprises, as component (B), at least one castor oil ethoxylate or a mixture of at least one castor oil ethoxylate and at least one further corrosion inhibitor based on organic carboxylic acids and/or heterocyclic compounds.

The organic carboxylic acids are in this case selected, in particular, from the group consisting of aliphatic $C_4$-$C_{12}$-monocarboxylic and -dicarboxylic acids, benzoic acid and benzenedicarboxylic acids and also the salts and anhydrides thereof. Examples of such organic carboxylic acids are isononanoic acid, succinic acid, adipic acid, sebacic acid, dodecanoic acid, benzoic acid and the alkali metal and ammonium salts thereof and also phthalic anhydride. The conversion of the organic carboxylic acids into their salts can also be carried out only in the finished corrosion protection formulation by addition of, for example, aqueous sodium hydroxide or potassium hydroxide solution. The heterocyclic compounds are, in particular, the abovementioned nitrogen-heterocyclic compounds, especially tolutriazole and benzotriazole.

Thickeners of the component (C) are generally high molecular weight substances which increase the velocity of a liquid. In general, suitable thickeners have, as a 0.5% strength by weight solution in water at 20° C., a viscosity of at least 50 mPas, preferably at least 500 mPas, particularly preferably at least 2000 mPas and in particular preferably at least 5000 mPas (determined as dynamic viscosity in accordance with ASTM D 4016-08). However, the viscosity of the aqueous 0.5% strength by weight solution is usually not more than 50 000 mPas.

The component (C) can comprise one or more natural thickeners or preferably one or more synthetic thickeners or mixtures thereof.

The choice of thickener depends on the use, the desired viscosity range, on the use temperature and on the solvent system which is to be thickened. The type of thickener is not critical for carrying out the invention, provided that the thickener system does not enter into any undesirable interaction with the corrosion inhibitor, the metallic surface to be protected or the other constituents which may be comprised.

Examples of suitable thickeners are given in Kittel, Lehrbuch der Lacke and Beschichtungen, volume 4, $2^{nd}$ edition 2007, pp. 285 to 316.

Natural thickeners are thickeners which are natural products or can be obtained by work-up, for example purification operations, in particular extraction, of natural products. Examples of inorganic natural thickeners are sheet silicates such as bentonite. Examples of organic natural thickeners are preferably proteins such as casein or more preferably polysaccharides. Particularly preferred natural thickeners are selected from among agar agar, carrageenan, gum Arabic, alginates such as sodium alginate, potassium alginate, ammonium alginate, calcium alginate and propylene glycol alginate, pectins, polyoses, carob seed flour and dextrins.

However, the use of synthetic thickeners is generally preferred. Examples of suitable synthetic thickeners are partially hydrolyzed polymers and copolymers of vinyl acetate. These preferably have a degree of hydrolysis of from 70 to 97%. Particular preference is given to partially hydrolyzed polyvinyl alcohols and polyvinyl alcohol itself.

Copolymers of vinyl acetate as thickeners are, in particular, fully hydrolyzed or partially hydrolyzed vinyl alcohol copolymers, in particular fully hydrolyzed copolymers of alkylvinyl esters and vinyl acetate having a proportion of alkylvinyl esters of preferably from 5 to 20 mol %, very particularly preferably copolymers of alkylvinyl acetate and vinyl acetate. Further possible thickeners are homopolymers and copolymers of N-vinylpyrrolidone.

Further suitable thickeners are homopolymers and copolymers of acrylic acid and methacrylic acid and also salts thereof, esters of acrylic acid or methacrylic acid, acrylamide, vinylpyrrolidone, alkylene oxides such as polyethylene oxides, styrene-maleic anhydride copolymers and salts thereof.

In a preferred embodiment, the corrosion protection formulation of the invention comprises, as component (C) at least one polyacrylate as synthetic thickener, where, for the purposes of the present invention, the term polyacrylate refers to both homopolymers and copolymers of acrylic acid. Such polyacrylates can also comprise acrylamide and/or methacrylic acid or derivatives thereof in copolymerized form. In general, such polyacrylates are not crosslinked or only weakly crosslinked.

Very particularly preferred synthetic thickeners are selected from among copolymers comprising from 85 to 95% by weight of acrylic acid, from 4 to 14% by weight of acrylamide and from 0.01 to 1% by weight of the (meth)acrylamide derivative of the formula

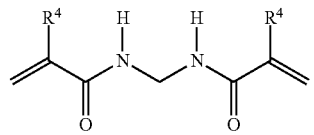

where the radicals $R^4$ can be identical or different and can be methyl or hydrogen.

Suitable synthetic thickeners generally have molecular weights $M_w$ in the range from 50 000 to 3 000 000 g/mol, preferably from 100 000 to 2 000 000 g/mol, particularly preferably from 200 000 to 1 000 000 g/mol (determined by means of gel permeation chromatography using polystyrene as standard).

In general, thickeners suitable as component (C) are solid in neat form. However, they can be used as solution or as dispersion, for example in water.

It is desirable but not absolutely necessary for the thickeners used to dissolve completely in the other constituents of the corrosion protection formulation of the invention at room temperature. The corrosion protection formulation of the invention is also effective when it has a plurality of phases. However, it is advantageous for the thickeners used to be able to be stirred readily into the corrosion protection formulation of the invention. The stirring-in of the thickeners frequently occurs at a slightly acidic pH, for example at a pH of from 3 to 4.

Furthermore, associative thickeners are suitable as thickeners. Associative thickeners comprise not only hydrophilic groups but also hydrophobic end groups or side groups in the molecule. Associative thickeners have a surfactant character and are generally capable of forming micelles.

Suitable associative thickeners are, for example, hydrophobically modified polyacrylates, hydrophobically modified cellulose ethers, hydrophobically modified polyacrylamides, hydrophobically modified polyethers or associative polyurethane thickeners comprising hydrophilic, relatively high molecular weight polyether segments which are linked via urethane groups and are capped by at least two terminal, hydrophobic molecule groups.

The thickener of the component (C), in particular the polyacrylate thickener, and the alkylamine ethoxylate surfactant of the component (A) and optionally further surface-active substances which aid the surfactant action of (A) should be considered to be an interactive system which can bring about non-Newtonian properties (thixotropic properties) in the corrosion protection formulation of the invention.

Freezing point-lowering alcohols of the component (D) are alkanols such as ethanol, n-propanol, isopropanol, n-butanol, isobutanol, sec-butanol, tert-butanol or n-pentanol, glycols such as monoethylene glycol or monopropylene glycol, polyalkylene glycols such as diethylene glycol, triethylene glycol, tetraethylene glycol, polyethylene glycols, dipropylene glycol, tripropylene glycol, tetrapropylene glycol or polypropylene glycols, with such polyalkylene glycols being able to be etherified at one end, and glycerol and also mixtures thereof.

In a preferred embodiment, the inventive corrosion protection formulation comprises monopropylene glycol or a mixture of monopropylene glycol and one or more other freezing point-lowering alcohols selected from among alkanols, glycols, polyalkylene glycols and glycerol as component (D).

The vegetable and fatty oils of the component (E) in the corrosion protection formulation of the invention serve mainly to produce the required physical consistency which is necessary for handlability and for an effective protective action. Vegetable oils (also referred to as plant oils) and fatty oils (also referred to as neutral fats) are oils obtained from oil plants. Starting materials for producing vegetable oils and fatty oils are oil seeds and oil fruits in which the oil is generally present in the form of lipids. Vegetable oils are predominantly esters of glycerol with saturated and/or unsaturated fatty acids, known as triglycerides. Examples of vegetable oils are avocado oil, peanut oil, sunflower oil, palm kernel oil, rapeseed oil, olive oil, poppy seed oil and soybean oil.

Depending on the proportion of unsaturated fatty acids, a distinction is made between nondrying vegetable oils (e.g. olive oil), half-drying vegetable oils (e.g. soybean oil and rapeseed oil) and drying vegetable oils (e.g. linseed oil or poppy seed oil). Here, the term "drying" does not refer to evaporation but to the thickening ("resinification") of the oil caused by oxidation by means of oxygen and subsequent polymerization of the unsaturated fatty acids. Drying oils thus have the highest content of unsaturated fatty acids. For the purpose of the present invention, such drying vegetable oils and fatty oils, in particular those having a content of oleic acid, linolic acid and linolenic acid of together more than 50% by weight, especially more than 70% by weight, based on the total content of fatty acids in the oil, are preferred.

In a preferred embodiment, the corrosion protection formulation of the invention comprises, as component (E), linseed oil which owing to its high content of oleic acid (from 10 to 22% by weight), linolic acid (from 12 to 18% by weight) and linolenic acid (from 56 to 71% by weight) (in each case based on the total content of fatty acids in the linseed oil) cures easily and thereby ensures lasting adhesion of the corrosion protection formulation of the invention to the metal surfaces to be protected against zinc and cadmium corrosion.

Particular preference is given to refined linseed oil (also referred to as boiled linseed oil), which represents a particularly purified linseed oil. The mucilaginous materials have been largely removed by heating and addition of bleaching earth in the case of refined linseed oil. This improves the oxygen uptake and increases the drying capability.

Water is in principle not an essential constituent of the corrosion protection formulation of the invention and normally gets into the formulation, if at all, only inevitably as a result of mixing-in of other water-comprising components. If the corrosion protection formulation of the invention comprises water as component (F), the pH thereof can be neutral, acidic or basic. The pH of the formulation is frequently set to a slightly basic value at the end. A typical corrosion protection formulation according to the invention has a pH of from 7 to 10, preferably from 7.5 to 9.5, in particular from 8 to 9.

If necessary, the addition of a conventional emulsifier as component (G) is advisable for providing the corrosion protection formulation of the invention in the form of a homogeneous dispersion or microemulsion. This emulsifier can consist of a single substance or of a mixture of a plurality of substances having an emulsifying action. The precise structure of the substances having an emulsifying action is inconsequential for the mode of action of the corrosion protection formulation of the invention; it merely has to be ensured that the emulsifier system does not enter into any undesirable interaction with the other components of the formulation and the metallic surface to be protected. Suitable emulsifiers as component (G) are commercially available; the products of the Emulgan® series from BASF SE are particularly well suited.

The present invention also provides a method of protecting zinc or zinc-plated components or surfaces or cadmium or cadmium-plated metallic surfaces against corrosion, wherein these substrates are treated with the corrosion protection formulation of the invention.

The corrosion protection formulation of the invention composed of the components present in the amounts indicated can be directly employed in this form for the use, i.e. in principle does not have to be diluted further. However, if desired, depending on the application method and application technology, it can be diluted further, for example with water. The corrosion protection is achieved by the formulation being applied mechanically in a fine spraying process, analogous to underfloor protection or hollow space protection in motor vehicles, to the surfaces to be protected. Application to the surfaces to be protected can be effected via a pressure system, for example a pressure spray gun.

Since the present invention is particularly suitable for protection of zinc and cadmium components and surfaces against corrosion in airport operation, the present invention also provides a method of protecting zinc or zinc-plated components or surfaces or cadmium or cadmium-plated metallic surfaces, especially on winter service vehicles at airports or on aircraft, against corrosion caused by runway deicing compositions used at airports, by treatment with the corrosion protection formulation of the invention.

The following examples relate to minimizing zinc corrosion caused by reproduced runway deicing compositions. They illustrate the present invention without limiting it.

EXAMPLES

Zinc Corrosion Test on Hot Galvanized Steel Sheets in a Manner Analogous to AMS 1435B The corrosion protection formulation according to the teaching of the present invention as indicated below was tested for its corrosion protection action in respect of the corrosion of zinc on hot-galvanized steel sheets by in each case 50% strength by weight aqueous potassium acetate and potassium formate solutions in a manner analogous to the corrosion tests from AMS 1435B (3.2.5.2 Total Immersion Corrosion).

In AMS 1435B, only test specimens from aircraft construction (e.g. cadmium-plated magnesium or aluminum alloys) are usually used. In the following tests on corrosion of zinc, the test specimens described in the standard were replaced by hot-galvanized steel sheets, but having the identical geometric shapes.

Formulation according to the invention ("IF") used [composition in % by weight]:

| | | |
|---|---|---|
| (A) | commercially available octylamine ethoxylate having 2 ethylene oxide unite | 0.90 |
| (B) | commercially available castor oil ethoxylate (Leunapon ® ER 40) | 0.30 |
| (B) | isononanoic acid | 1.30 |
| (B) | dodecanedioic acid | 0.50 |
| (B) | sodium benzoate | 0.50 |
| (B) | phthalic anhydride | 0.13 |
| (B) | tolutriazole | 0.10 |
| | aqueous potassium hydroxide solution (48% strength by weight) | 1.64 |
| (C) | polyacrylate thickener (Lutexal ® GP ECO) | 0.01 |
| (D) | monopropylene glycol | 41.17 |
| (E) | refined linseed oil | 49.00 |
| (F) | water | 2.44 |
| (G) | commercial emulsifier (Emulan ® ELH 60) | 2.00 |
| | commercial antifoam | 0.01 |
| | Total: | 100.00 |

Experiment 1

Potassium Formate Solution and Protected Hot-Galvanized Steel Sheets

Metal: hot-galvanized steel sheets (50×20×2 mm)
Container: 100 ml glass flask made of Duran® glass
Test medium: hot-galvanized steel sheet without surface protection (i.e. bare) in potassium formate solution (50% strength by weight, pH: 9-10)
Test: clean hot-galvanized steel sheets (test specimens) in acetone, dry, weigh (triplicate determination);
 fully immersed in 100 ml of the potassium formate solution; 7 days at 40° C. in a drying oven
Evaluation: take test specimen from the test medium, rinse with water, clean in acetone, weigh (triplicate determination)

| Mass before test [g] | Mass after test [g] | Δ decrease in mass after test [mg] |
|---|---|---|
| 15.9543 | 15.8797 | 74.6 |
| 17.4241 | 17.3597 | 64.4 |
| 18.1169 | 18.0338 | 83.1 |

Experiment 2

Potassium Acetate Solution and Unprotected Hot-Galvanized Steel Sheets

Metal: hot-galvanized steel sheets (50×20×2 mm)
Container: 100 ml glass flask made of Duran® glass
Test medium: hot-galvanized steel sheet without surface protection (i.e. bare) in potassium acetate solution (50% strength by weight, pH: 9-10)
Test: clean hot-galvanized steel sheets (test specimens) in acetone, dry, weigh (triplicate determination);
 fully immersed in 100 ml of the potassium acetate solution; 7 days at 40° C. in a drying oven
Evaluation: take test specimen from the test medium, rinse with water, clean in acetone, weigh (triplicate determination)

| Mass before test [g] | Mass after test [g] | Δ decrease in mass after test [mg] |
|---|---|---|
| 17.6523 | 17.6134 | 38.9 |
| 17.9249 | 17.8647 | 60.2 |
| 18.1410 | 18.0930 | 48.0 |

Experiment 3

Potassium Formate Solution and Protected Hot-Galvanized Steel Sheets

Metal: hot-galvanized steel sheets (50×20×2 mm)
Container: 100 ml glass flask made of Duran® glass
Test medium: hot-galvanized steel sheet with surface protection (IF) in potassium formate solution (50% strength by weight, pH: 9-10)
Test: clean hot-galvanized steel sheets (test specimens) in acetone, dry, weigh (triplicate determination);
 dip test specimen into IF, allow to drip off (1 hour) and dry on a clock glass (1 hour);
 fully immersed in 100 ml of the potassium formate solution; 7 days at 40° C. in a drying oven
Evaluation: take test specimen from the test medium, rinse with water, clean in acetone, weigh (triplicate determination)

| Mass before test [g] | Mass after test [g] | Δ decrease in mass after test [mg] |
|---|---|---|
| 17.5020 | 17.5005 | 1.5 |
| 17.8144 | 17.8087 | 5.7 |
| 17.9339 | 17.9297 | 4.2 |

Experiment 4

Potassium Acetate Solution and Protected Hot-Galvanized Steel Sheets

Metal: hot-galvanized steel sheets (50×20×2 mm)
Container: 100 ml glass flask made of Duran® glass
Test medium: hot-galvanized steel sheet with surface protection (IF) in potassium acetate solution (50% strength by weight, pH: 9-10)
Test: clean hot-galvanized steel sheets (test specimens) in acetone, dry, weigh (triplicate determination);
 dip test specimen into IF, allow to drip off (1 hour) and dry on a clock glass (1 hour);
 fully immersed in 100 ml of the potassium acetate solution; 7 days at 40° C. in a drying oven
Evaluation: take test specimen from the test medium, rinse with water, clean in acetone, weigh (triplicate determination)

| Mass before test [g] | Mass after test [g] | Δ decrease in mass after test [mg] |
|---|---|---|
| 17.7708 | 17.7688 | 2.0 |
| 17.6682 | 17.6652 | 2.0 |
| 17.2248 | 17.2223 | 2.5 |

It can be seen that the values for removal of material in the case of a 50% strength by weight potassium formate solution are somewhat higher than in the case of a 50% strength by weight potassium acetate solution.

The formulation according to the invention (IF) was able to reduce the degree of corrosion on zinc dramatically both in the case of 50% strength by weight aqueous potassium acetate solution and also in the case of 50% strength by weight aqueous potassium formate solution and, completely surprisingly, reduce it on average by a factor of 20.

The invention claimed is:

1. A formulation, comprising:
   0.01 to 5% by weight of an alkylamine ethoxylate as a surfactant,
   0.01 to 10% by weight of a corrosion inhibitor,
   0 to 0.3% by weight of a thickener,
   greater than or equal to 5% but less than 75% by weight of at least one freezing point-lowering alcohol selected from the group consisting of an alkanol, a glycol, a polyalkylene glycol, and glycerol
   from 5 to 90% by weight of a vegetable oil, a fatty oil, or both,
   from 0 to 5% by weight of water, and
   from 0 to 5% by weight of an emulsifier,
   wherein said corrosion inhibitor comprises an alkoxylated castor oil and optionally at least one further corrosion inhibitor.

2. The formulation according to claim 1, wherein the alkylamine ethoxylate comprises a C3-C20-alkyl radical.

3. The formulation according to claim 1, wherein the alkylamine ethoxylate comprises from 1 to 35 ethylene oxide units.

4. The formulation according to claim 1, wherein the alkylamine ethoxylate comprises a linear C7-C12-alkyl radical and comprises from 1.8 to 9 ethylene oxide units.

5. The formulation according to claim 1, wherein the corrosion inhibitor comprises a castor oil ethoxylate or a mixture of a castor oil ethoxylate and an additional corrosion inhibitor based on an organic carboxylic acid, a heterocyclic compound, or both.

6. The formulation according to claim 5, wherein the castor oil ethoxylate comprises from 2 to 200 mol of ethylene oxide per mol.

7. The formulation according to claim 6, wherein the freezing point-lowering alcohol comprises monopropylene glycol or a mixture of monopropylene glycol and an additional freezing point-lowering alcohol selected from the group consisting of an alkanol, a glycol, a polyalkylene glycol, and glycerol.

8. The formulation according to claim 7, wherein the vegetable oil, fatty oil, or both comprise a linseed oil.

9. The formulation according to claim 8, wherein the alkylamine ethoxylate comprises a linear C7-C12-alkyl radical and comprises from 1.8 to 9 ethylene oxide units.

10. The formulation according to claim 9, wherein the formulation comprises said thickener, and wherein said thickener comprises a polyacrylate.

11. The formulation according to claim 1,
    wherein the formulation comprises said thickener, and wherein said thickener comprises a polyacrylate.

12. The formulation according to claim 1,
    wherein the freezing point-lowering alcohol comprises monopropylene glycol or a mixture of monopropylene glycol and an additional freezing point-lowering alcohol selected from the group consisting of an alkanol, a glycol, a polyalkylene glycol, and glycerol.

13. The formulation according to claim 1,
    wherein the vegetable oil, fatty oil, or both comprise a linseed oil.

14. A method of protecting a substrate against corrosion, the method comprising:
    treating the substrate with the formulation according to claim 1,
    wherein the substrate is zinc, a zinc-plated component, a zinc-plated surface, cadmium, or a cadmium-plated metallic surface.

15. The method according to claim 14,
    wherein the corrosion is caused by a runway deicing composition used at an airport.

16. The formulation according to claim 1, comprising said water.

17. The formulation according to claim 16, comprising said emulsifier water.

* * * * *